(12) United States Patent
Cameron

(10) Patent No.: US 10,184,821 B2
(45) Date of Patent: Jan. 22, 2019

(54) SYSTEM AND METHOD FOR DETERMINING THE LEVEL OF A SUBSTANCE IN A CONTAINER BASED ON MEASUREMENT OF RESONANCE FROM AN ACOUSTIC CIRCUIT THAT INCLUDES UNFILLED SPACE WITHIN THE CONTAINER THAT CHANGES SIZE AS SUBSTANCE IS ADDED OR REMOVED FROM THE CONTAINER

(71) Applicant: Robert H. Cameron, El Paso, TX (US)

(72) Inventor: Robert H. Cameron, El Paso, TX (US)

( * ) Notice: Subject to any disclaimer, the term of this patent is extended or adjusted under 35 U.S.C. 154(b) by 84 days.

(21) Appl. No.: 15/137,100

(22) Filed: Apr. 25, 2016

(65) Prior Publication Data

US 2016/0313170 A1    Oct. 27, 2016

Related U.S. Application Data

(63) Continuation-in-part of application No. 14/596,375, filed on Jan. 14, 2015, now Pat. No. 9,322,697, which is a continuation-in-part of application No. 13/673,555, filed on Nov. 9, 2012, now Pat. No. 9,057,638.

(51) Int. Cl.
   *G01F 23/296*    (2006.01)
(52) U.S. Cl.
   CPC .............................. *G01F 23/2966* (2013.01)
(58) Field of Classification Search
   CPC .................................................. G01F 23/2966
   See application file for complete search history.

(56) References Cited

U.S. PATENT DOCUMENTS

| | | | |
|---|---|---|---|
| 3,324,716 | A | 6/1967 | Roberts |
| 3,540,275 | A | 11/1970 | Post et al. |
| 4,599,892 | A | 7/1986 | Doshi |
| 4,704,902 | A | 11/1987 | Doshi |

(Continued)

FOREIGN PATENT DOCUMENTS

| | | |
|---|---|---|
| WO | 8403834 A1 | 7/1986 |
| WO | 9010849 A1 | 9/1990 |

OTHER PUBLICATIONS

Liu, F., "A Tunable Electromechnical Helmholtz Resonator," University of Florida (2007) pp. 15-49.

*Primary Examiner* — John Fitzgerald
*Assistant Examiner* — Rodney T Frank
(74) *Attorney, Agent, or Firm* — Loza & Loza, LLP; Luis M. Ortiz; Kevin L. Soules

(57) ABSTRACT

Level of substance in a container can be determined by exciting vapor in unfilled space within the container. Variable frequency oscillator and emitting transducer can provide signals to excite resonance of vapor. Sensors can measure the peak resonant signal of vapor excited in unfilled space within the container as the amount of substance in the container changes. A signal-processing unit coupled to the sensor and variable frequency oscillator can process signals sensed by the sensing transducer and can extract them from background noise affecting the acoustic signal of the system using correlation functions by referencing the signal generated by the variable frequency oscillator. A computer can obtain the sign processed by the signal-processing unit and calculate the unfilled space within the container and derive therefrom an amount of filled space representing the amount of the substance contained therein. A gauge can indicate the amount of substance in the container.

10 Claims, 15 Drawing Sheets

(56) References Cited

U.S. PATENT DOCUMENTS

| | | | |
|---|---|---|---|
| 4,729,245 | A | 3/1988 | Hansman, Jr. |
| 4,811,595 | A | 3/1989 | Marciniak et al. |
| 5,226,320 | A | 7/1993 | Dages et al. |
| 5,251,482 | A | 10/1993 | Bates et al. |
| 5,319,973 | A | 6/1994 | Crayton et al. |
| 5,349,852 | A | 9/1994 | Kamen et al. |
| 5,533,389 | A | 7/1996 | Kamen et al. |
| 5,575,310 | A | 11/1996 | Kamen et al. |
| 5,793,705 | A | 8/1998 | Gazis et al. |
| 5,856,953 | A | 1/1999 | Durkee |
| 5,895,848 | A | 4/1999 | Wilson et al. |
| 6,138,507 | A | 10/2000 | Getman et al. |
| 7,213,456 | B2 | 5/2007 | Rollwage et al. |
| 7,296,472 | B2 | 11/2007 | Cobb |
| 7,707,877 | B2 | 5/2010 | Nishizu et al. |
| 7,784,331 | B2 | 8/2010 | Ellson et al. |
| 7,856,876 | B2 | 12/2010 | Bostrom |
| 7,900,505 | B2 | 3/2011 | Mutz et al. |
| 7,905,143 | B2 | 3/2011 | Lagergren |
| 7,926,341 | B2 | 4/2011 | Boudaoud et al. |
| 7,971,956 | B2 | 7/2011 | Zhang |
| 2008/0211838 | A1 | 9/2008 | Zhang |
| 2008/0279415 | A1 | 11/2008 | Roemer et al. |
| 2009/0112476 | A1 | 4/2009 | Parker |

SYSTEM AND METHOD FOR DETERMINING THE LEVEL OF A SUBSTANCE IN A CONTAINER BASED ON MEASUREMENT OF RESONANCE FROM AN ACOUSTIC CIRCUIT THAT INCLUDES UNFILLED SPACE WITHIN THE CONTAINER THAT CHANGES SIZE AS SUBSTANCE IS ADDED OR REMOVED FROM THE CONTAINER

STATEMENT OF PRIORITY

The present application is a continuation-in-part of nonprovisional patent application Ser. No. 14/596,375, entitled "System and Method for Determining the Level of a Substance in a Container Based on Measurement of Resonance from an Acoustic Circuit that Includes Unfilled Space within the Container that Changes Size as Substance is Added or Removed from the Container," filed Jan. 14, 2015. Patent application Ser. No. 14/596,375 is incorporated herein by reference in its entirety.

Patent application Ser. No. 14/596,375 is a continuation-in-part of nonprovisional patent application Ser. No. 13/673,555, entitled "System and Method for Determining the Level of a Substance in a Container Based on Measurement of Resonance from an Acoustic Circuit that Includes Unfilled Space within the Container that Changes Size as Substance is Added or Removed from the Container," filed Nov. 9, 2012, which is herein incorporated by reference in its entirety.

The present application claims the priority and benefit of patent application Ser. No. 14/596,375 and patent application Ser. No. 13/673,555.

TECHNICAL FIELD

The present invention is generally related to measurement devices used to measure the level of a substance (e.g., liquid or solid) within a container (e.g., a vessel, tank, room). The present invention is more particularly related to systems and methods for determining the amount of liquid within a container by measuring the resonance from an acoustic circuit including an empty space as a component of the acoustic circuit within the container that changes in size as the amount of the substance is added or removed from the container.

BACKGROUND

A fuel gauge is an instrument used to indicate the level of fuel contained in a tank. Although commonly used in automobiles, similar gauges can also be used to determine the substance level for any tank including underground fuel storage tanks.

When used in automobiles, the fuel gauge typically consists of two parts: the sensing unit and the indicator. The sensing unit usually uses a float connected to a potentiometer. The indicator is usually mounted in a dashboard of modern automobiles and typically includes a needle calibrated to point to a scale consisting of printed ink designed as a metered analog gauge with a needle indicating the level of fuel that remains in a tank based on where the needle is pointing to on the gauge. As the tank empties, the float drops and slides a moving contact along a resistor, increasing its resistance. In addition, when the resistance is at a certain point, it will also typically turn on a "low fuel" light on some vehicles.

There are many problems with the current state of the art for liquid level measurement. The principle problem is that the float system is not linear. When the float is horizontal it accurately measures the level of fluid in the tank. As the float becomes more vertical, it is no longer accurate. Also, irregularities in the shape and position of the tank may affect the accuracy of the system. Therefore, there is a need for another safer, non-contact based method for fuel level to be determined. Modern vehicles usually have a computer that calculates "miles to empty", but the older system of electrical measurement causes wild fluctuations in the calculations; therefore, a vehicle operator cannot completely rely on the accuracy of the system when planning a future stop to refuel.

Helmholtz resonance is the phenomenon of air resonance within a cavity such as the noise that occurs when one blows across the top of an empty bottle. The air in the port or tube (also referred to as the neck of the chamber) has mass and friction with the walls of the tube. A longer tube would make for a larger mass and more friction and vice-versa. The diameter of the tube is also related to the mass of air. The resonance of a bottle can change as liquid is added inside the bottle. The present inventor believes that Helmholtz resonance can be used to measure substance by measuring the unfilled space (unfilled with respect to a substance, but containing a vapor) in a container allowing the calculation of the amount of substance filling the container, which is the primary goal of the present invention, for which details will now be further described below. Resonant signals vary in frequency and amplitude.

BRIEF SUMMARY

It is a feature of the present invention to provide a system for determining the amount of substance within a container by measuring the resonance from an acoustic circuit including unfilled space as a component of the acoustic circuit within the container that changes in size as the amount of the substance is added or removed from the container.

It is another feature of the present invention to include in the system an emitting transducer providing a signal generated by a variable frequency oscillator to excite acoustic resonance of an acoustic circuit represented by a container having an unfilled space containing vapor analogous to a capacitor of an acoustic circuit, and a tube (which can be variable in length for tuning) analogous to an inductor of an acoustic circuit, and the vapor experiences friction as it moves within the tube, which is analogous to a resistor of an acoustic circuit. The tube may have an opening that can be capped by a metal disc including a flexible seal connecting the outer perimeter of the cap with the mouth of an opening associated with the tube.

It is yet another feature of the present invention to provide a sensing transducer for measuring the amplitude of the signal as it changes as the circuit achieves resonance and as the container is filled or empties.

It is another feature of the present invention to provide a signal-processing unit that can be coupled to the sensing transducer and to the variable frequency oscillator that is driving the emitting transducer. The signal-processing unit can process the signal sensed by the sensing transducer to extract it from any background noise affecting the acoustic resonance system using correlation functions by referencing the signal generated by the variable frequency oscillator.

It is another feature of the present invention to provide a computer wherein the signal processed by the signal-processing unit is provided to the computer to calculate the empty space of the container and thus derive an amount of filled space representing the amount of the substance in the container.

It is another feature of the present invention to provide a gauge in communication with the computer to provide a readout or indication of how much substance is in the container and/or an estimate of when the substance will be depleted.

DETAILED DESCRIPTION

Figure 1:
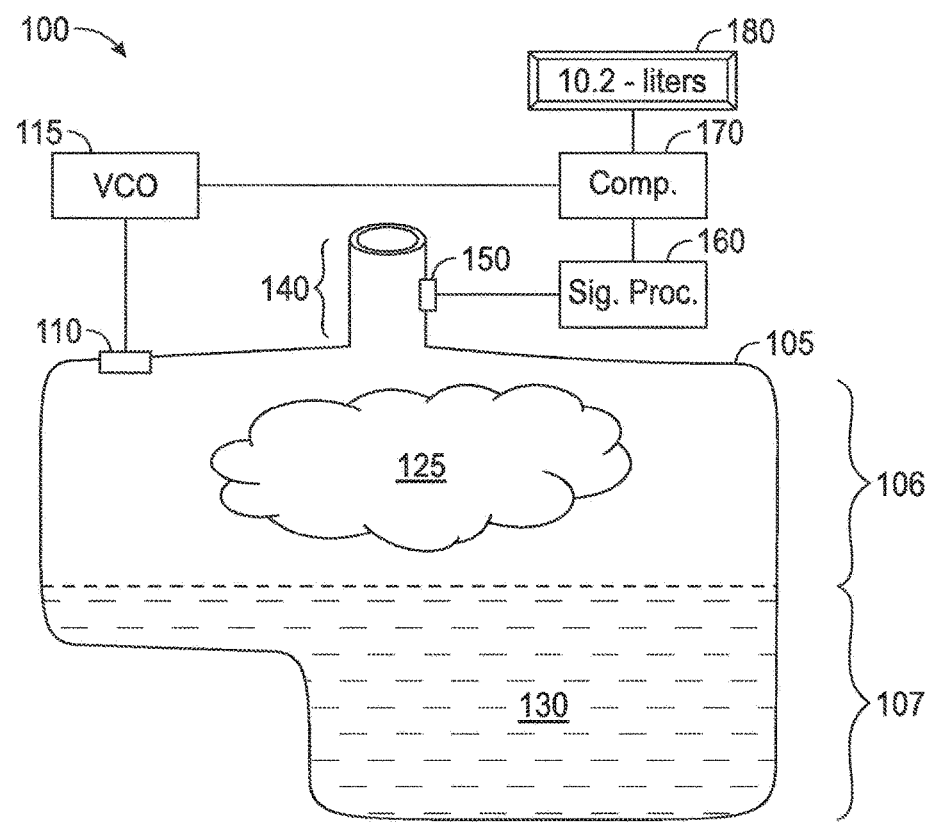
FIG. 1 illustrates a block diagram of a system for measuring the level of a substance in a container.

Referring to FIG. 1, a system 100 is illustrated for measuring the level of a substance in a container. The system 100 includes an emitting transducer 110 that can provide a signal generated by a variable frequency oscillator 115 in an unfilled space 106 containing a vapor 125 (substance empty, vapor-filled space) located within a container 105 that is also containing a substance 130 within filled space 107. Signals from the emitting transducer 110 excite acoustic resonance of an acoustic circuit represented by a container 105, the unfilled space 106 filled with vapor 125 (analogous to a capacitor of an acoustic circuit). A tube 140 analogous to an inductor of an acoustic circuit can be provided wherein the vapor 125 (also found in the tube) experiences friction as it moves within the tube 140. The vapor 125 is analogous to a resistor of an acoustic circuit.

A sensing transducer 150 mounted on the container 105 measures resonance (amplitude and frequency of signal) as it changes when the resonant circuit achieves resonance in the tube 140 as substance 130 is added or removed from the container 105. A signal-processing unit 160 can be coupled to the sensing transducer 150 and to the variable frequency oscillator 115 that is driving signals to the emitting transducer 110. The signal-processing unit 160 processes resonant signals sensed by the sensing transducer 150 with reference to signals generated by the variable frequency generator 115 and can extract the resonant signals from background noise using correlation functions.

A computer 170 can be provided in the system wherein signals processed by the signal-processing unit 160 are provided to the computer 170 to calculate the unfilled space 106 of the container 105 and thus derive an amount of substance 130 contained by filled space representing the amount of the substance 130 in the container 105. A gauge 180 (e.g., digital readout, analog readout, etc.) can be provided in communication with the computer 170 to provide a readout or indication of at least one of: how much substance is in the container, an estimate of when the substance will be depleted, and the rate of substance depletion (e.g., when substance is being used as a combustible in a power generating system).

Figure 2:
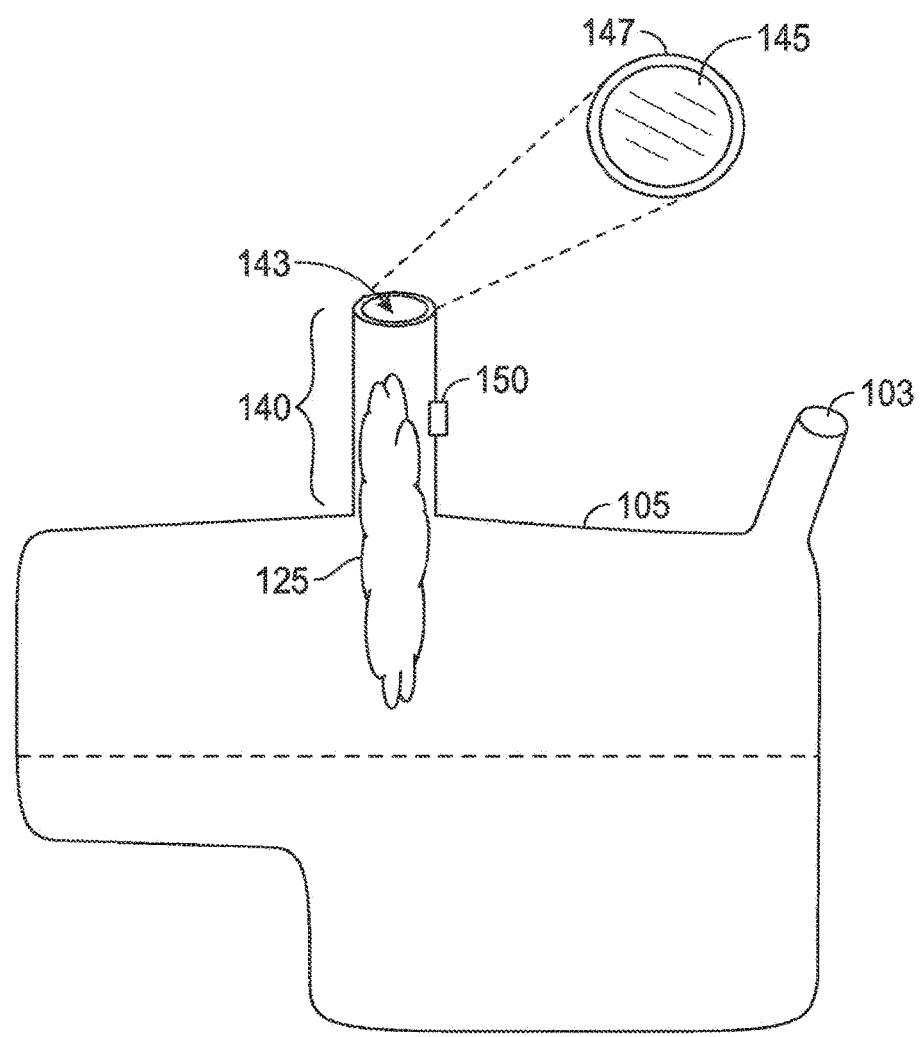
FIG. 2 illustrates a block diagram of a system for measuring the level of substance in a container including a tube that can be varied in length to enable turning of the acoustic circuit. Also shown is a cap that can be used to seal an opening formed at an end of said tube and can be attached to the opening with a flexible surround around the cap's perimeter, because the lid should be able to freely move as the system resonates.

Referring to FIG. 2, the tube 140 can be varied in length to enable tuning and/or calibration of the acoustic circuit. A cap 145 can be used to seal an opening 143 formed at an end of said tube 140. The cap 145 can be attached to the opening with a flexible surround 147 around the caps perimeter, because the lid should be able to freely move as the system resonates.

Figure 8A:
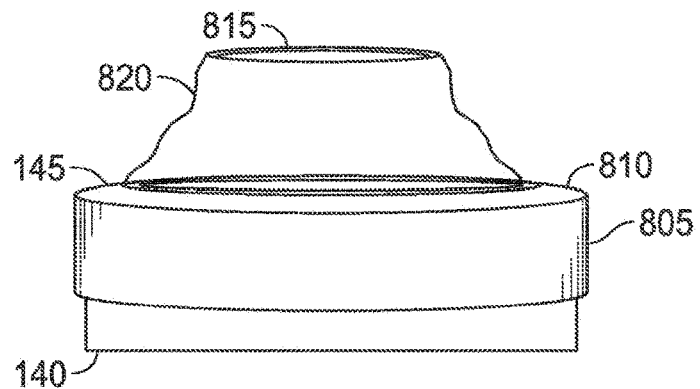
FIGS. 8A-8D illustrate alternative configurations for caps, associated with systems and methods for measuring the level of substance in a container.

Alternative embodiments of cap 145 are shown in FIGS. BA-C. FIG. 8A illustrates a cap 145 in accordance with a preferred embodiment of the invention. In this embodiment, cap 145 is shown connected to tube 140. Cap 145 is configured of a ridged base ring 805 and a ridged top ring 810. The joint between the base ring 805 and top ring 810 holds a flexible upper 820. The center of the flexible upper is configured with a high-density top cap or weight 815. The high-density top cap 815 is configured of a material that is dense and therefore relatively heavy for its size. High-density top cap 815 is optional. Helmholtz resonance is best achieved when tube 140 is left open. However, for many applications, such as vehicle gas tanks, it is impractical or illegal to leave tube 140 uncovered. The flexible cap 145 is configured to allow flexible upper 820 to move so that the Helmholtz resonance inside the tank is affected as little as possible. In a preferred embodiment, flexible upper 820 is formed with concentric folds that allow the flexible upper 820 and high-density top cap 815 to rest in a relatively flat plane above the tank (as shown in FIG. 12B). When the flexible upper is perturb, for example, by pressure waves in tank 105, the extra material in the folds allows the flexible upper to extend upward or downward.

Figure 8B:
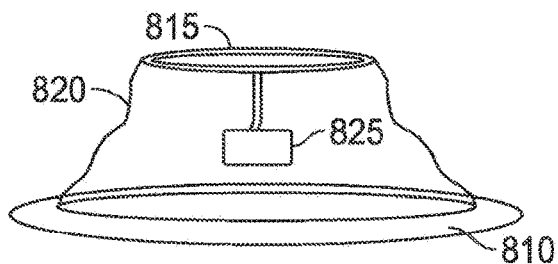
Figure 8C:
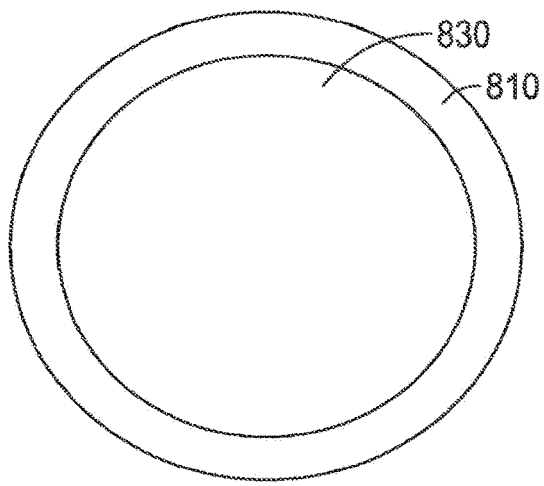
Figure 8D:
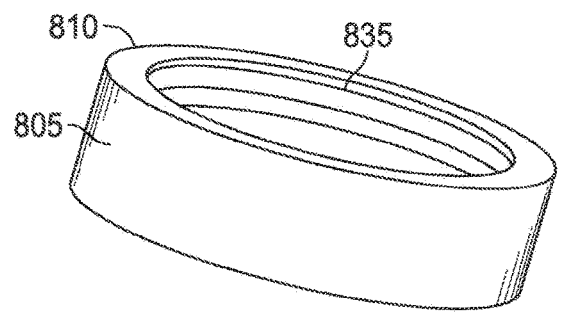

FIG. 8B illustrates an alternative embodiment of cap 145 wherein the high density top cap 815 is fitted with an additional weight 825. FIG. 8C illustrates a top view of top ring 810 and in particular the inner edge 830 of top ring 810 which can be configured to be threaded along with base ring 805 as shown by threads 835 in FIG. 8D. Cap 145 can be installed on tube 140 via a threaded connection as shown.

The sensing transducer 150 can be mounted in the tube 140 extending from the container 105, although it can be possible to mount the sensing transducer 150 at other areas around the container 105. In some tanks, it may be necessary to include a separate fill tube 103 for use in inserting or removing substance from the tank. A separate fill tube 103 will prevent the sensing transducer 150 and tube 140 from becoming disturbed or damaged. It should be appreciated that other tubing may be used in connection with the system but do not require disclosure herein to understand the present invention. Examples of additional tubing include fuel lines as used to deliver fuel to the combustion system or engine in an automobile.

Figure 3A:
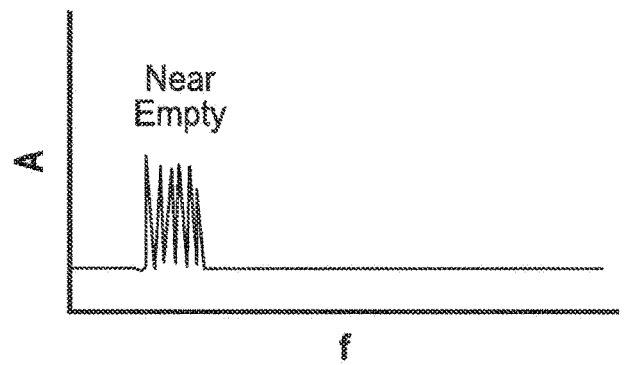
FIGS. 3A through 3C illustrate charts of resonant signals measured when a container is near empty, half empty, and near full.
Figure 3B:
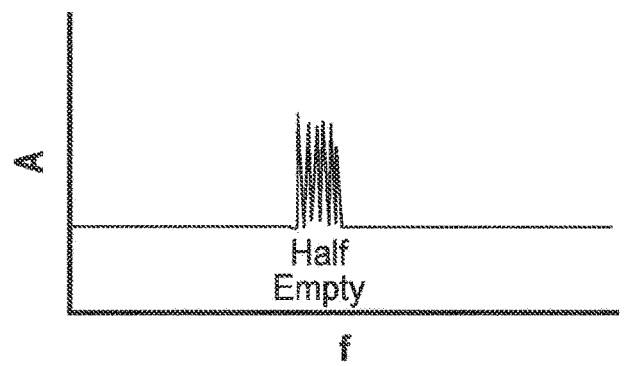
Figure 3C:
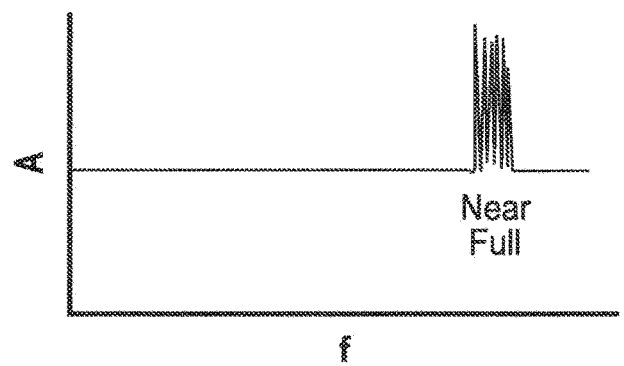
Figure 10:
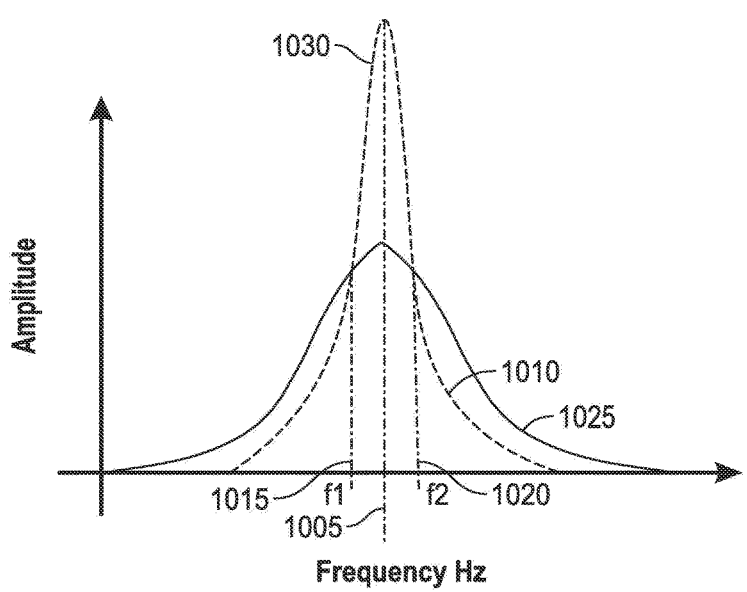
FIG. 10 illustrates the amplitude of a resonator as a function of frequency as it relates to systems and method for measuring the level of substance in a container.

Referring to FIGS. 3A-3C, charts of resonant signals measured when a container is near empty, half empty, and near full are shown. A quality factor or "Q," for the resonant frequency is an important consideration in accurately measuring the level of substance in a tank. Resonators with a high "Q" resonate with greater amplitudes at the resonant frequency and have a smaller range of frequencies around that frequency. Thus, the disclosed high-Q acoustical circuit does a better job of filtering out unwanted signals nearby on the spectrum than a similar resonator with a low "Q". Further, high "Q" resonators oscillate in a smaller range of frequencies and are generally more stable. In the presently disclosed acoustical circuit, the quality factor needs to be very high to ensure accuracy. As the quality factor decreases, the accuracy of the level measurement also decreases. Mathematically the quality factor "Q" can be expressed as shown in equation (1).

$$Q = fc/\Delta f \quad (1)$$

where fc is the resonant frequency and Δf is the half-power bandwidth. FIG. 10 illustrates two signals, one with a high Q and one with a low Q. In FIG. 10, amplitude is shown as a function of frequency. Signal 1005 illustrates a resonant frequency curve with a low quality factor. This can be seen by the relatively large half-power bandwidth of the signal 1025 at the resonant frequency 1005. By contrast, the peak 1030 of signal 1010 has a much higher amplitude at resonant frequency 1005 and has a much more narrow half-power bandwidth between frequencies 1015 and 1020. In a preferred embodiment, the acoustical circuit disclosed herein is configured to have a very high "Q" which is preferably less than a three cycle shift.

Figure 4:
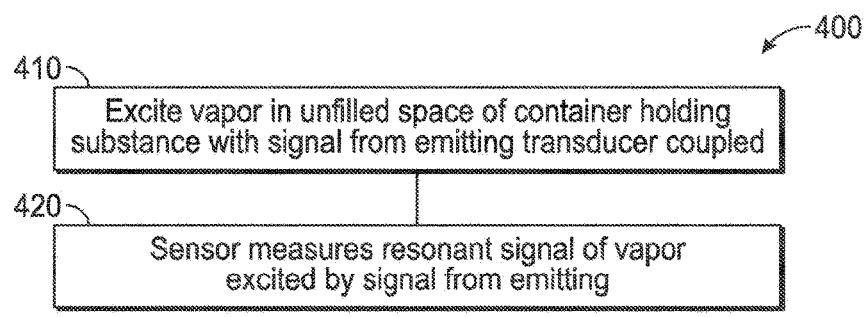
FIG. 4 illustrates a flow diagram of a method for determining the level of a substance in a container.

Referring to the flow diagram 400 in FIG. 4, a method for determining the level of a substance in a container is described. As shown in block 410, vapor in an unfilled space 106 within a container 105 holding a substance 130 is excited by a resonant signal provided from an emitting transducer 110 coupled to a variable frequency oscillator 115 providing signals to the emitting transducer 110 that excite resonance. Then a sensor 150 is used to measure the resonant signal of the vapor 125 excited by the signal from the emitting transducer 110 as shown in block 420. The resonant signal is a component of an acoustic circuit created by the unfilled space 106 that changes as the amount of the substance 130 is added or removed from the container 105. The sensor 150 can detect the frequency and amplitude of resonant signals created in the tube 140 and unfilled space 106 associated with the container and extending away from the unfilled space 106. The resonant circuit created by vapor 125 in the container's unfilled space and the tube achieves resonance as substance 130 within container 105 is added or removed from the container 105.

In an alternative embodiment, block 410 can include periodical impulse excitation. In a bounded domain such as tank 105, a single wave (for example, the wave produced by emitter 110) becomes a series of resonant frequencies as they are reflected between the walls of the tank. As a result, the bounded wave resonates at multiple frequencies. This makes detection of the resonant frequency more difficult. In order to overcome this problem, emitter 110 can periodically emit a signal to "kick" the resonant frequencies. These frequencies will then diminish to zero at varying rates with the fundamental frequency which is a property of the resonating body and the frequency of interest, remaining longest. As a result, this frequency can be identified by kicking the frequencies in the resonator with emitter 110 and then identifying the remaining frequency which is indicative of the resonant frequency of interest and can be used to measure the level of a substance in the tank.

Figure 5:
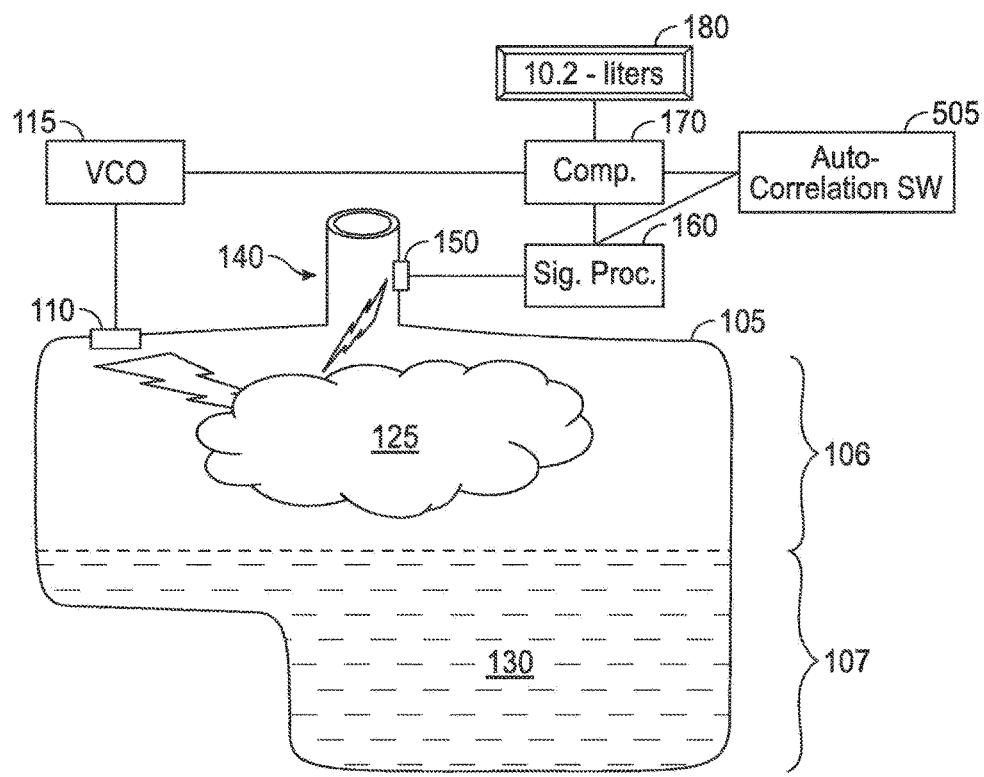
FIG. 5 illustrates the system described in FIG. 1 where correlation software can be used by a signal-processing unit and/or computer to process signals sensed by the sensing transducer and extract them from any background noise affecting the acoustic resonance system using correlation functions by referencing the signal generated by the variable frequency oscillator.

Referring to FIG. 5, the system 100 described in FIG. 1 is shown where correlation software 505 can be used by a signal-processing unit 160 and/or computer 170 to process signals sensed by the sensing transducer 150 and extracts them from any background noise affecting the acoustic resonance system using correlation functions by referencing the signal generated by the variable frequency oscillator 115. A signal-processing unit 160 can be provided and coupled to the sensing transducer 150 and to the variable frequency oscillator 115 that is driving the emitting transducer 110 in order to process signals using correlation.

Container 105 is very likely to be disposed in a noisy environment. For example, container 105 may be a gas tank on a car. In a typical car ride, the gas tank of the vehicle is exposed to traffic noise, engine vibration, etc. Additionally, the fact that the Helmholtz resonator (i.e., container 105) must be capped means that the loudness of the tone is dampened making it very hard to detect. The methods and systems disclosed herein require identification of very specific frequencies in order to accurately measure the unfilled space 106. However, the frequencies themselves are intrinsically noisy, and therefore difficult to detect. These endemic problems must be solved in order to accurately measure the unfilled space 106 in the container.

In one embodiment, software 505 can be used by the signal-processing unit 160 and computer 170 to implement a cross-correlation (or auto-correlation) technique to aid in the identification of relevant frequencies. Cross-correlation can be understood as a measure of the similarity of two waveforms as a function of time lag applied to one of them.

Figure 9A:
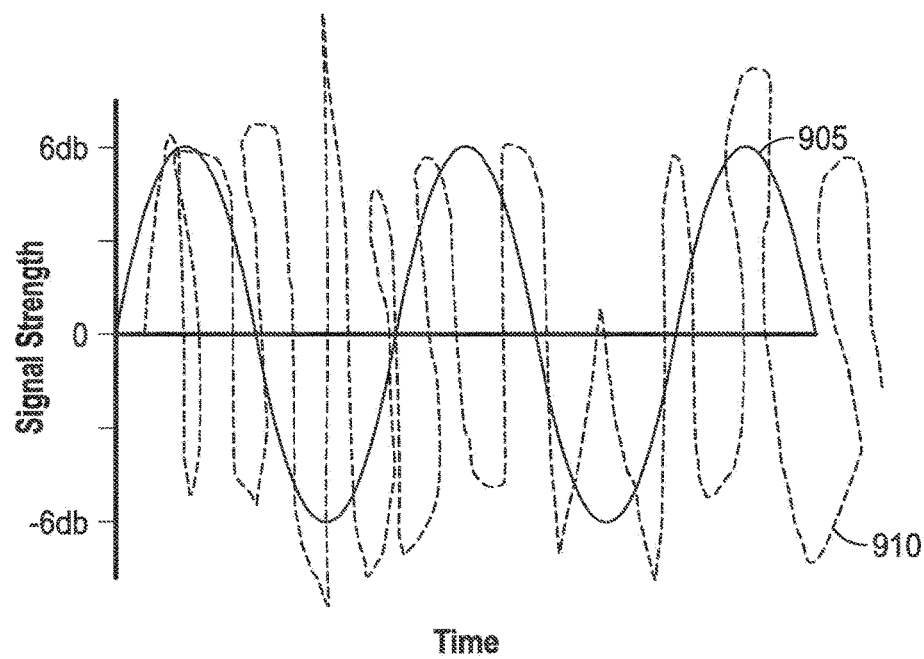
FIGS. 9A-9D illustrate the principle of cross-correlation as it relates to systems and methods for measuring the level of substance in a container.
Figure 9B:
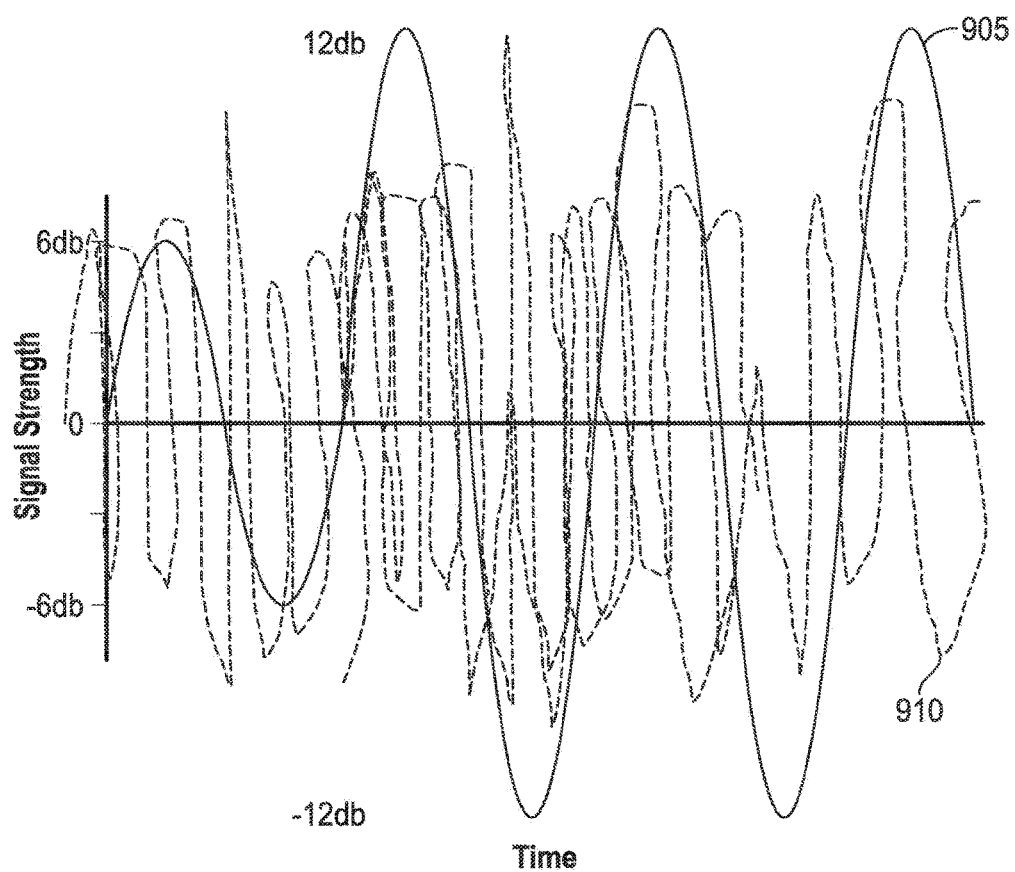
Figure 9C:
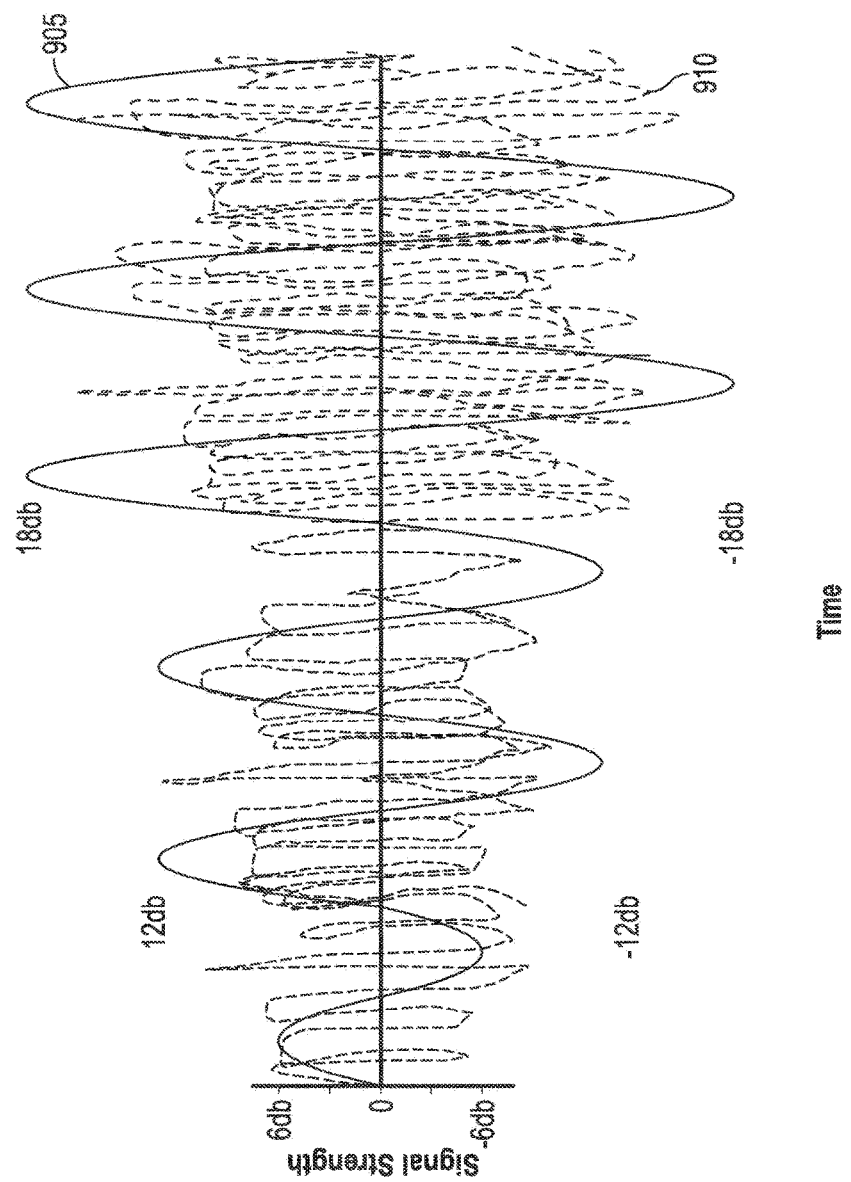
Figure 9D:
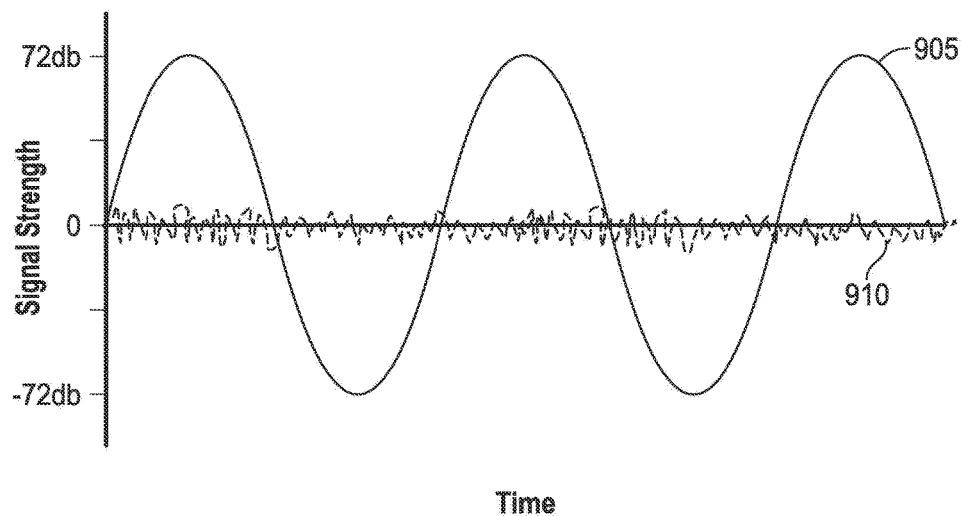

FIGS. 9A-D illustrate how cross-correlation can be used to lift the resonant frequency out of the background noise inevitably present in tank 105. In FIG. 9A, signal strength is illustrated as a function of time. In, for example, a tank 105, the signal strength of noise 910 will be significant compared to the resonant signal 905 as shown. This makes it very difficult to identify the resonant frequency, and by extension, determine the level of the substance 130 in tank 105. However, as shown in FIG. 9B, the application of a cross-correlation technique makes identification of the resonant frequency more reliable. As the signal is shifted and delayed by one cycle, the amplitude of the desired signal 905 increase by more than the noise 910. In FIG. 9C, the signal has been shifted and delayed by two cycles. Again, the amplitude of the desired signal 905 increase much more than that of noise 910. FIG. 9D illustrates the application of a cross-correlation technique where the signal is shifted and delayed by many cycles. As illustrated, after many cycles the amplitude of signal 905 has a dramatically higher amplitude than noise 910. Thus, FIG. 9D shows how the desired signal 905 has been lifted out of noise 910 and is therefore much easier to measure.

As applied in the present embodiment, the frequency associated with the resonant signal provided from the emitting transducer 110 coupled to a variable frequency oscillator 115 can be provided to software 505. The resonant signal collected from sensor 150 can also be provided to software 505. Software 505 is configured to delay one of the emitted signal or the recorded signal in time. The signal is delayed in many steps in order to simulate the discrete time steps as a continuous variable (i.e., time). For example, the time delayed steps may range from 1 Hz to many thousands of Hz or more as required. As the "sliding" signal (that signal being time delayed) is shifted, the emitted and recorded signals are integrated (or summed). When the two respective signals align the integration is additive, highlighting the similarity and "lifting" it from the noise. The noise associated with each signal is also additive, but because it is random sums much more slowly. This is a result of the fact that when the sum of the signals is a sum of pressures whereas the sum of noise is a sum of powers. Each time the number of delayed cycles is doubled, the signal to noise ratio improves by approximately 3 dB. Cross-correlation is preferred over other signal processing methods such as Fast Fourier Transforms (FFTs) because FFTs are not target to the desired frequency. Cross-correlation can be used to lift the specific, in this case resonant, frequency alone out of the noise, which is critical for accurate level measurement.

Software 505 is thus configured to identify the summation of the two signals above some threshold as indicative of the frequency associated with the resonance in the container 105. This can then be used to determine the amount of unfilled space 106 in the container 105, and in turn the amount of substance 130 in the container 105.

A computer 170 is provided to obtain the signal processed by the signal-processing unit 160 and calculate unfilled space 106 within the container 105 and derive therefrom an amount of filled space 107 representing the amount of the substance 130 contained within the container 105.

A gauge 180 can, be provided in communication with the computer 170 to provide a readout or analog indication of at least one of how much substance is in the container 105, an estimate of when the substance will be depleted, and the efficiency of substance depletion. The efficiency of substance depletion is a measure of vehicle efficiency, such as the vehicle's miles traveled per gallon of fuel or "mileage"). It can be determined by determining the amount of fuel the vehicle has used to travel a given distance (for example, in a car).

In many applications, the unfilled space 106 in container 105 is occupied by a vapor 125 resulting from the substance 130 held in the container 105. In gases temperature, molecular composition, pressure, and heat capacity ratio can all change the speed that sound travels through the gas. For purposes of this invention it is important to understand that the frequency of a resonator is dependent on the temperature and volume of the resonator. Together, these dictate the frequency produced by the oscillator. The speed of sound can be simply determined by the wavelength of the sound multiplied by the frequency of the sound. If the speed of sound changes, so too will the frequency. Thus, the speed of sound must be determined in order to accurately determine the unfilled space in the container.

In one embodiment, a tube 605 can be provided in the container 105. The tube 605 can include a conduit 610 to rigidly support the tube 605 in the unfilled space 106 in the container 105. The conduit 610 can also provide an electrical connection between a piezoelectric transducer 615 on one end of the tube 605 and a signal generator (e.g., a computer 170) associated with the system. The second end of the tube 605 is left open so that the vapor 125 present in the unfilled space 106 in the container 105 also occupies the unfilled space inside the tube 605.

The piezoelectric transducer 615 can be signaled by the signal generating computer 170 to send a "ping" of known frequency down the tube 605. The frequency of the "ping" should be selected to not interfere with the resonance of the Helmholtz resonator. The signal "ping" is reflected back from the open end of the tube 605 and detected by the transducer 615 which provides a signal to computer 170. The length of the tube 605 is known and the signal generating computer 170 can measure the time lapse between the signal ping generation and the detection of the reflected response. From this information, the speed of the sound traveling through the vapor 125 can be calculated.

The speed of sound in the container 105 can and should be measured regularly, for example, every few seconds, once a minute, or once an hour. Regular recalculation is necessary because, as the amount of substance 130 occupying the container 105 changes, the content of the vapor 125 can also change, the temperature within the container 105 may change, etc., and concurrently the speed of sound in the container 105 may change.

Figure 6:
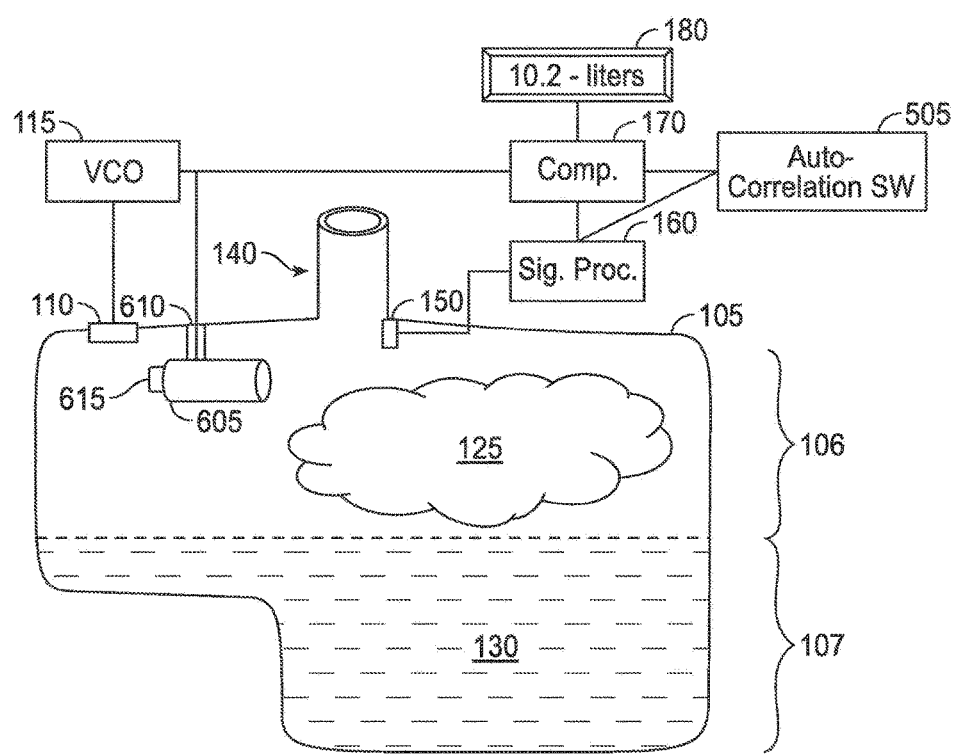
FIG. 6 illustrates the system described in FIG. 5 including a device for measuring the speed of sound inside the container.
Figure 7A:
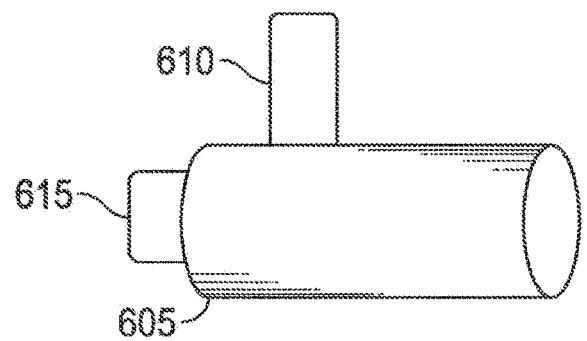
FIGS. 7A-7C illustrate alternative configurations of devices for measuring the speed of sound inside the container.
Figure 7B:
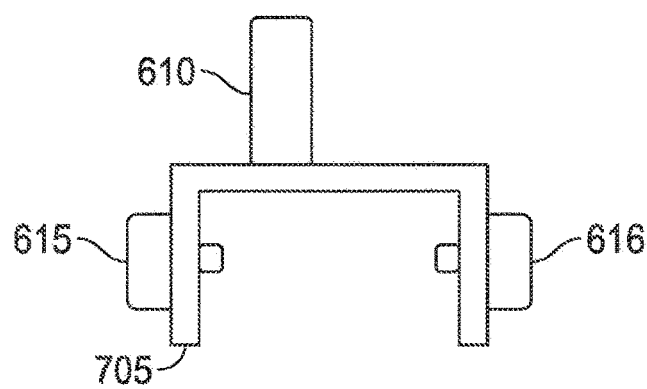
Figure 7C:
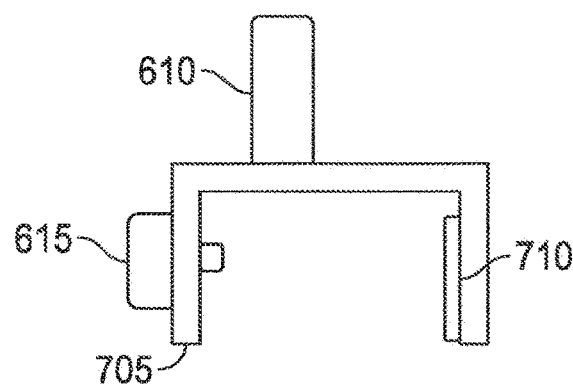

FIGS. 7A-C, a series of alternative configurations for speed of sound detectors are illustrated. FIG. 7A illustrates the tube arrangement 600 shown deployed in FIG. 6. Equivalent or identical features of these arrangements are labeled with equivalent reference numerals.

In FIG. 7B, a U-shaped bracket 705 can be fitted inside the container 105. The U-shaped bracket 705 can be mounted to the inside of the container 105 or alternatively can be mounted to a conduit 610. On one end, the U-shaped bracket 705 can be fitted with a piezoelectric transducer 615. The signal generating computer 170 can signal the transducer 615 to generate a signal ping. A second transducer 616 can be configured on the opposite wall of the U-shaped bracket 705 and can signal the computer 170 upon detection of the signal ping. It is important that U-shaped bracket 705 be mounted inside container 105 with the open side of the U-shape pointed toward the substance 130 to allow the free flow of vapor 125 inside and between the walls of the U-shaped bracket 705 so that the signal ping travels through the vapor 125.

FIG. 7C illustrates that the U-shaped bracket 705 is fitted with a single Piezoelectric transducer 615 on one wall of the bracket 705. On the opposite wall of the bracket 705, a reflecting plate 710 can be provided. The signal-generating computer 170 can signal the piezoelectric transducer 615 to generate a signal ping. The signal ping is reflected off of the reflecting plate 710 and back to the piezoelectric transducer 615 which signals be computer 170 to record the signal ping detection.

In each of the three embodiments shown in FIGS. 7A-7C, the speed of sound can be calculated using the known distance the signal ping travels from its generation at Piezo-electric transducer 615 to detection and using the time it takes for the signal ping to travel that distance. In each of the embodiments, the function of the mounting apparatus (e.g., tube 605 or U-shaped bracket 705) is important because they allow the vapor to naturally occupy the space through which the signal ping travels.

Figure 11:
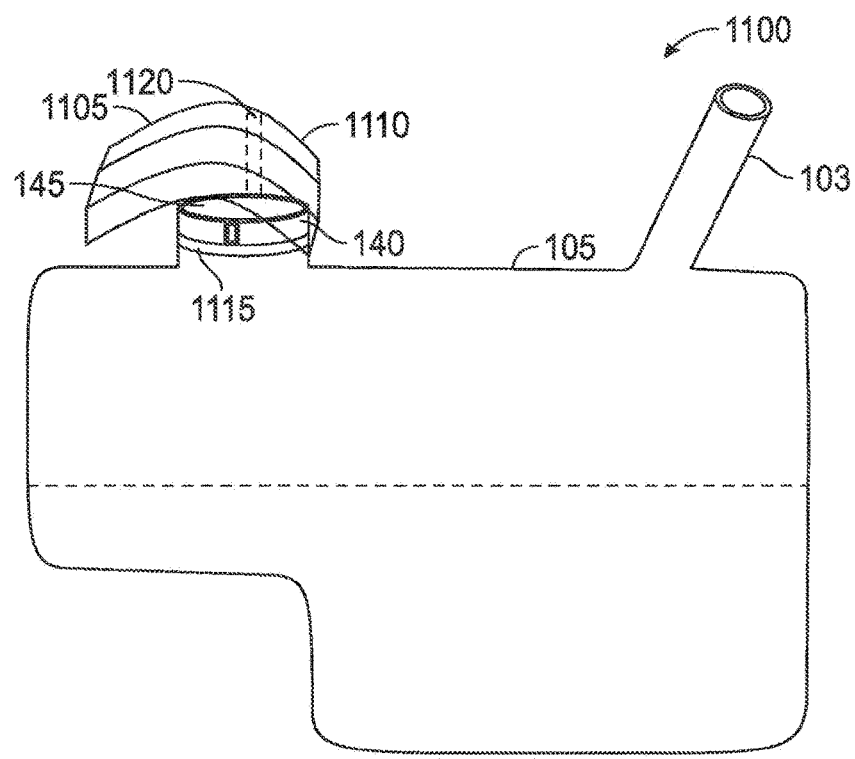
FIG. 11 illustrates a block diagram of an alternative embodiment of a system for measuring the level of a substance in a container.

FIG. 11 illustrates an alternative embodiment of a system 1100 wherein the level of the substance in tank 105 can be identified by passively exciting a resonant signal in the tank 105. In this embodiment, a deflector baffle 1110 is fixed over the flexible cap 145, in a deflector baffle assembly 1105. When a vehicle associated with tank 105 is in motion, ambient air will effectively flow over tank 105. The deflector baffle 1110 is designed to direct this air over the flexible cap 145 on tube 140. When the deflected air moves over the flexible cap 145, the cap 145 can vibrate exciting acoustic resonance of an acoustic circuit represented by the container 105 having an unfilled space containing vapor analogous to a capacitor of an acoustic circuit, and the tube 140 (which can be variable in length for tuning) analogous to the inductor of an acoustic circuit. The vapor in the tank 105 experiences friction as it moves within the tube 140, which is analogous to a resistor of an acoustic circuit.

As described above for other embodiments, in this embodiment a sensing transducer 150 mounted on the container 105 measures resonance (amplitude and frequency of signal) passively driven by the air flowing over cap 145, as it changes when the resonant circuit achieves resonance in the tube 140 as substance 130 is added or removed from the container 105. A signal-processing unit 160 can be coupled to the sensing transducer 150. The signal-processing unit 160 processes resonant signals sensed by the sensing transducer 150 with reference to signals generated by the passively driven vibration of the flexible cap 145 and can extract the resonant signals from background noise using auto-correlation functions.

A computer 170 can be provided in the system wherein signals processed by the signal-processing unit 160 are provided to the computer 170 to calculate the unfilled space 106 of the container 105 and thus passively derive an amount of substance 130 contained by filled space representing the amount of the substance 130 in the container 105. A gauge 180 (e.g., digital readout, analog readout, etc.) can be provided in communication with the computer 170 to provide a readout or indication of at least one of: how much substance is in the container, an estimate of when the substance will be depleted, and the rate of substance depletion.

Figure 12A:
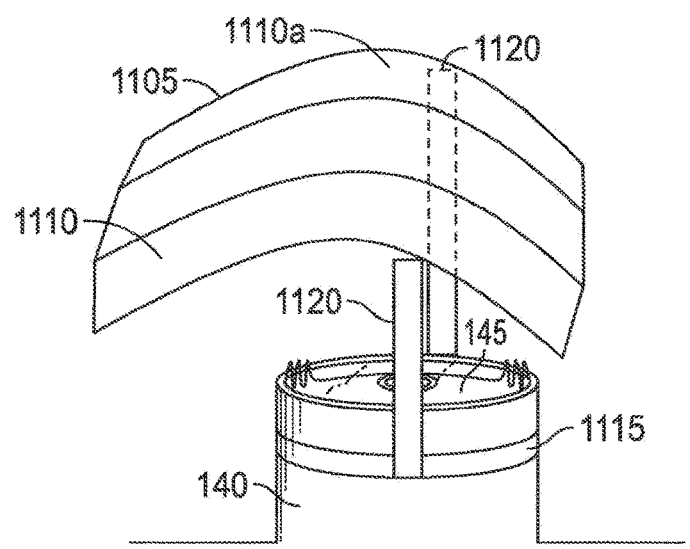
FIGS. 12A-12C illustrate alternative configurations of baffles associated with an alternative embodiment of a system for measuring the level of a substance in a container.
Figure 12B:
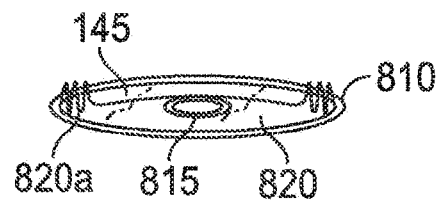

FIG. 12A illustrates the deflector baffle and flexible cap assembly 1105. The deflector baffle 1110 can be comprised of a curved wind catch 1110a. The wind catch 1110a is formed over the flexible cap 145 so that as the tank 105 is moved through the air, the air (which is moving relative to the tank) is caught by the wind catch 1110a and directed over the flexible cap 145. The wind catch 1110a is held over the flexible cap 145 with struts 1120. FIG. 12A illustrates two struts 1120, but more or fewer may also be used depending on design considerations.

FIG. 12B illustrates flexible cap 145. It is important to notice that flexible cap 145 shown in FIG. 12B includes upper 820, which is configured to be folded 820a at the edges and includes a weighted member 815. This design allows the flexible cap 145 to vibrate when wind is pushed over it, thereby exciting a resonant signal in the tank 105.

Figure 12C:
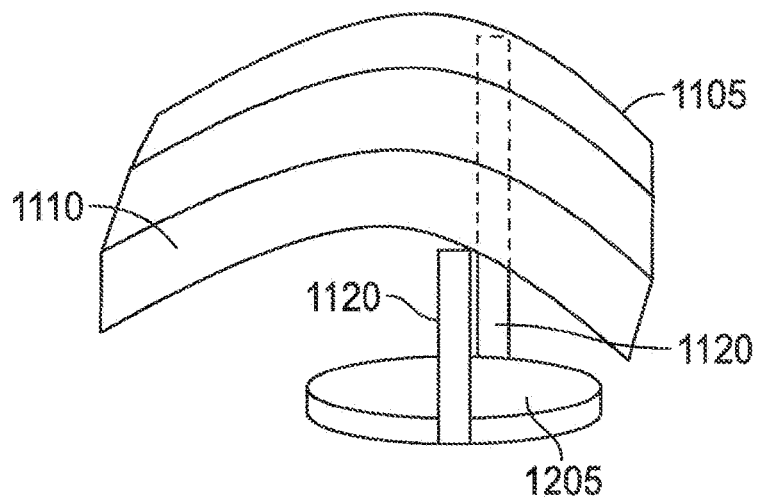

FIG. 12C illustrates an alternative embodiment wherein the deflector baffle 1110 assembly is deployed over an opening 1205 in tank 105, rather than over a cap 145. In this embodiment, the opening of tube 140 is left uncapped. When air is directed over the opening 1205 by deflector baffle 1110, the wind creates pressure waves in the tube 140 which excite a resonant signal in the tank 105.

Figure 13:
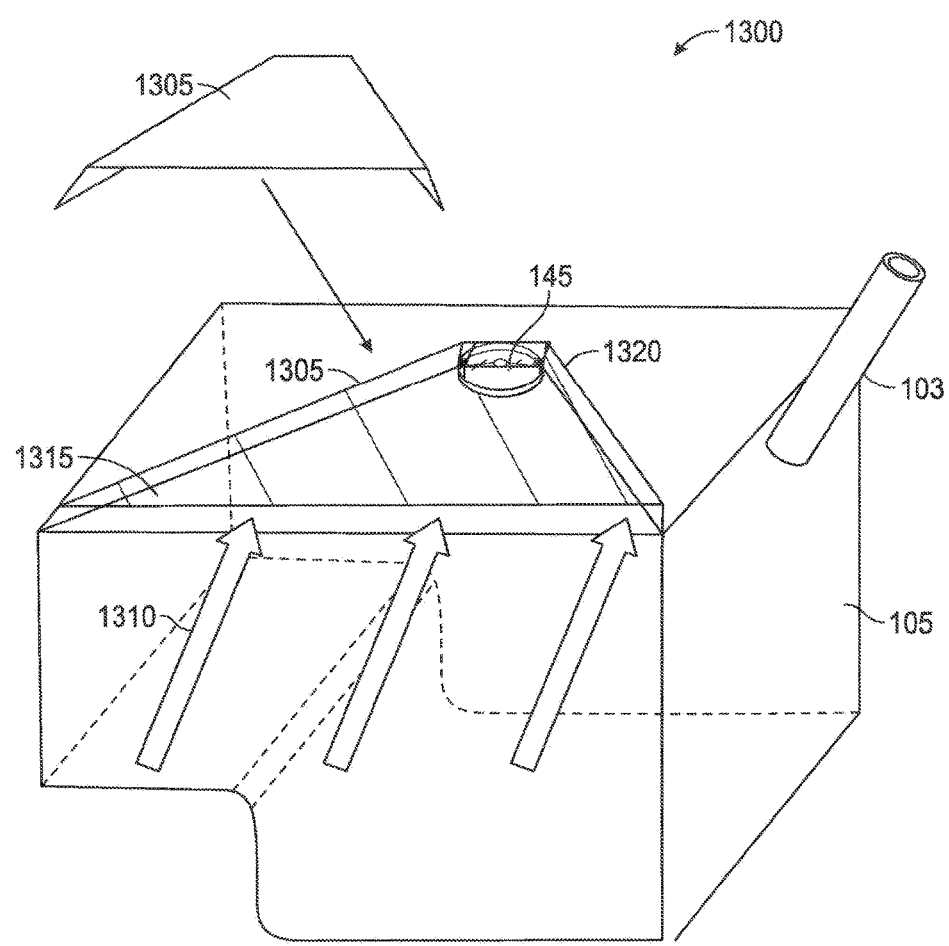
FIG. 13 illustrates a block diagram of another alternative embodiment of a system for measuring the level of a substance in a container.

FIG. 13 illustrates yet another alternative embodiment of the system 1300 wherein the deflector baffle is designed to be a flat air scoop 1305. In this embodiment, the air scoop 1305 is tapered with a larger end 1315 facing the incoming air 1310 and the tapered end 1320 formed about the flexible cap 145. As arrows 1310 indicate, ambient air flowing over tank 105 is directed over the tube 140 with flexible cap 145 by air scoop 1305. The it scoop 1305 can be fixedly connected to tank 105 via weld rivets, jointing compound, screws, cement, nails, or other such connection means. It should be appreciated that in this embodiment tube can be arranged with or without flexible cap 145 depending on design considerations. It should also be understood that the shape of air scoop 1305 may vary depending on design considerations.

Figure 14:
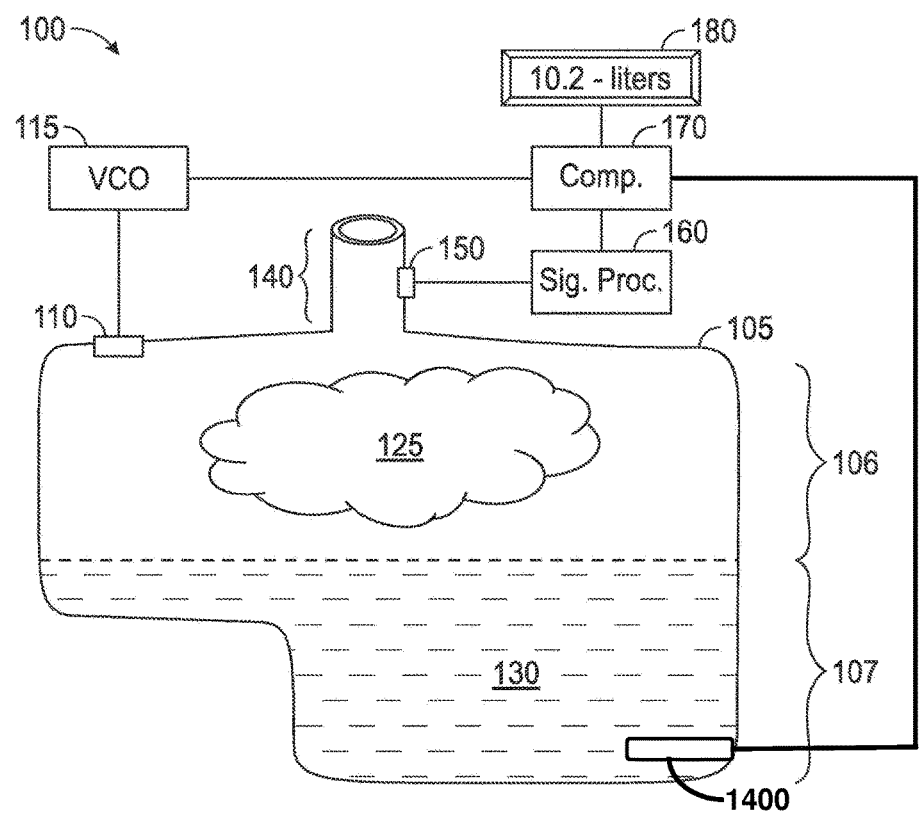
FIG. 14 illustrates a block diagram of another alternative embodiment of a system for measuring the level of a substance in a container.

FIG. 14 illustrates another embodiment of system 100 for measuring the level of a substance in a container. The system 100 includes an emitting transducer 110 that can provide a signal generated by a variable frequency oscillator 115 in an unfilled space 106 containing a vapor 125 (substance empty, vapor-filled space) located within a container 105 that is also containing a substance 130 within filled space 107. Signals from the emitting transducer 110 excite acoustic resonance of an acoustic circuit represented by a container 105, the unfilled space 106 filled with vapor 125 (analogous to a capacitor of an acoustic circuit). A tube 140 analogous to an inductor of an acoustic circuit can be provided wherein the vapor 125 (also found in the tube) experiences friction as it moves within the tube 140. The vapor 125 is analogous to a resistor of an acoustic circuit.

A sensing transducer 150 mounted on the container 105 measures resonance (amplitude and frequency of signal) as it changes when the resonant circuit achieves resonance in the tube 140 as substance 130 is added or removed from the container 105. A signal-processing unit 160 can be coupled to the sensing transducer 150 and to the variable frequency oscillator 115 that is driving signals to the emitting transducer 110. The signal-processing unit 160 processes resonant signals sensed by the sensing transducer 150 with reference to signals generated by the variable frequency generator 115 and can extract the resonant signals from background noise using correlation functions.

A computer 170 can be provided in the system wherein signals processed by the signal-processing unit 160 are provided to the computer 170 to calculate the unfilled space 106 of the container 105 and thus derive an amount of substance 130 contained by filled space representing the amount of the substance 130 in the container 105. A gauge 180 (e.g., digital readout, analog readout, etc.) can be provided in communication with the computer 170 to provide a readout or indication of at least one of: how much substance is in the container, an estimate of when the substance will be depleted, and the rate of substance depletion (e.g., when substance is being used as a combustible in a power generating system).

The system further includes a temperature sensor 1400 configured for measuring the temperature of the liquid inside the container. As the temperature of liquid 130 changes, for example, due to changing temperatures in the surrounding external environment, the liquid's volume also changes. This can affect the accuracy of the determination of the unfilled space 106 in container 105. The temperature sensor 1400 is connected to computer 170 and can be used to compute a change in the volume of the liquid 130 resulting from temperature change of the liquid. The change in the volume of the liquid can be used to adjust the calculation of the unfilled space 106 of the container 105 and thus derive an amount of substance 130 contained by filled space representing the amount of the substance 130 in the container 105.

The temperature sensor 1400 may comprise a thermometer that is resistant to the corrosive effects of the liquid 130. The thermometer 1400 is illustrated as attached to the lower portion of the interior of tank 105. The temperature sensor must be attached to the tank such that it is in operable connection with the liquid 130. As such, the temperature sensor 1400 can be attached to the interior of the tank at or near the bottom of the tank 105. It should further be appreciated that the temperature sensor may be used with any combination of the embodiments disclosed herein.

The invention claimed is:

1. A system for measuring the volume of a substance in a container, comprising:
    an emitting transducer providing a signal generated by a variable frequency oscillator to excite acoustic resonance of an acoustic circuit represented by a container having an unfilled space filled with a vapor analogous to a capacitor of an acoustic circuit, and a tube analogous to an inductor of an acoustic circuit, wherein the vapor experiences friction as it moves within the tube, which is analogous to a resistor of an acoustic circuit;
    a sensing transducer measuring amplitude of the signal as it changes as the circuit achieves resonance and as the container is filled or emptied;
    a speed of sound transducer configured to emit and detect a signal ping inside said container to determine a speed of sound in said container;
    a temperature sensor for measuring a temperature of said substance; and
    a signal processing unit coupled to the sensing transducer and the variable frequency oscillator driving the emitting transducer, said signal processing unit processing the signal sensed by the sensing transducer to extract it from background noise by referencing the signal generated by the variable frequency oscillator and shifting said sensed signal by one or more cycles according to a cross-correlation technique, and wherein a frequency decrease in the sensed signal is indicative of a decrease in the volume of the substance in the container.

2. The system of claim 1, further comprising a computer associated with said signal processor wherein said correlation functions comprise cross-correlation functions.

3. The system of claim 2, wherein the signal processed by the signal processing unit is provided to the computer to calculate the unfilled space of the container and thus derive an amount of filled space representing the amount of the substance in the container.

4. The system of claim 3, further comprising a gauge in communication with the computer to provide a readout or indication of at least one of: how much substance is in the container, an estimate of when the substance will be depleted, and the rate of substance depletion when substance is being used as a combustible in a power generating system.

5. The system of claim 4, wherein said tube is variable in length to enable tuning of the acoustic circuit.

6. The system of claim 5, further comprising a cap capping an opening formed at an end of said tube, wherein said cap comprises a ridged ring, a flexible upper, and a high density top cap.

7. The system of claim 1 further comprising:
    a conduit connecting said container to a tube wherein said speed of sound transducer is configured on one end of said tube.

8. The system of claim 1 further comprising:
    a conduit connecting said container to a U-shaped bracket wherein said speed of sound transducer is configured on one side of said U-shaped bracket and a reflecting plate is configured on an opposite side of said U-shaped bracket.

9. The system of claim 1 wherein said signal has a high quality factor.

10. The system of claim 1 further comprising:
    a conduit connecting said container to a U-shaped bracket wherein said speed of sound transducer is configured on one side of said U-shaped bracket and a second speed of sound transducer is configured on an opposite side of said U-shaped bracket.

* * * * *